(12) United States Patent
Miranda

(10) Patent No.: US 8,408,601 B1
(45) Date of Patent: Apr. 2, 2013

(54) MAGNETIC TIRE GUARD

(76) Inventor: Ramon Miranda, Chicago, IL (US)

( * ) Notice: Subject to any disclaimer, the term of this patent is extended or adjusted under 35 U.S.C. 154(b) by 0 days.

(21) Appl. No.: 13/106,617

(22) Filed: May 12, 2011

(51) Int. Cl.
 *B62D 25/18* (2006.01)
(52) U.S. Cl. ....................................................... 280/847
(58) Field of Classification Search .................. 280/847, 280/152.2, 152.3, 851, 852, 159, 160, 160.1; 188/218 A
 See application file for complete search history.

(56) References Cited

U.S. PATENT DOCUMENTS

| | | |
|---|---|---|
| 2,654,480 A | 10/1953 | Stem |
| 3,737,176 A | 6/1973 | Cobb |
| 3,831,847 A | 8/1974 | Serritella |
| D331,380 S | 12/1992 | Craddock |
| 6,113,169 A | 9/2000 | Gohman et al. |
| D433,377 S | 11/2000 | Dill |
| 6,394,475 B1 | 5/2002 | Simon |
| 7,094,268 B2 * | 8/2006 | Krantz .......................... 55/385.3 |
| 2007/0278781 A1 | 12/2007 | Downes |

* cited by examiner

*Primary Examiner* — John Walters
*Assistant Examiner* — James Triggs

(57) ABSTRACT

A magnetic tire guard for picking up metal objects before they come in contact with a tire of a vehicle featuring a flap. A curved indentation is disposed at the intersection of the first side edge and the top edge of the flap. A plurality of mounting holes is disposed in the flap along the curved indentation, allowing for attachment of the flap to a wheel well of a vehicle. A magnet is disposed at the bottom edge of the flap. The magnet functions to attract metal objects. The magnet is attached to the flap via a magnet attachment means.

3 Claims, 3 Drawing Sheets

MAGNETIC TIRE GUARD

FIELD OF THE INVENTION

The present invention is directed to a device for picking up metal debris such as nails, screws, metal fragments, or other such objects. More particularly, the present invention is directed to a magnetic tire guard for picking up metal objects before they come in contact with a tire of a vehicle.

BACKGROUND OF THE INVENTION

Flat tires are often a result of the tire coming in contact with a nail or other metal object on the road. The present invention features a magnetic tire guard for picking up metal objects and debris such as nails, screws, metal fragments, or other such objects before they come in contact with a tire of a vehicle. By removing these objects before they come in contact with the tire, the risk of a tire puncture is greatly reduced. The magnetic tire guard of the present invention is for attaching to the front of a wheel well of a vehicle, in front of the tire.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a magnetic tire guard attachable to a wheel well of a vehicle. In some embodiments, the magnetic tire guard comprises a flap having a front surface, a back surface, a top edge, a bottom edge, a first side edge, and a second side edge; a curved indentation disposed at an intersection of the first side edge and the top edge of the flap; a plurality of mounting holes disposed in the flap along the curved indentation, the mounting holes are for receiving a mounting attachment means so as to allow the magnetic tire guard to be attached to a wheel well of a vehicle; and a magnet disposed at the bottom edge of the flap, the magnet functions to attract metal objects, the magnet is attached to the flap via a magnet attachment means.

In some embodiments, the mounting attachment means includes a bolt or a screw. In some embodiments, the magnet attachment means is a nut and bolt.

DESCRIPTION OF PREFERRED EMBODIMENTS

Figure 1:
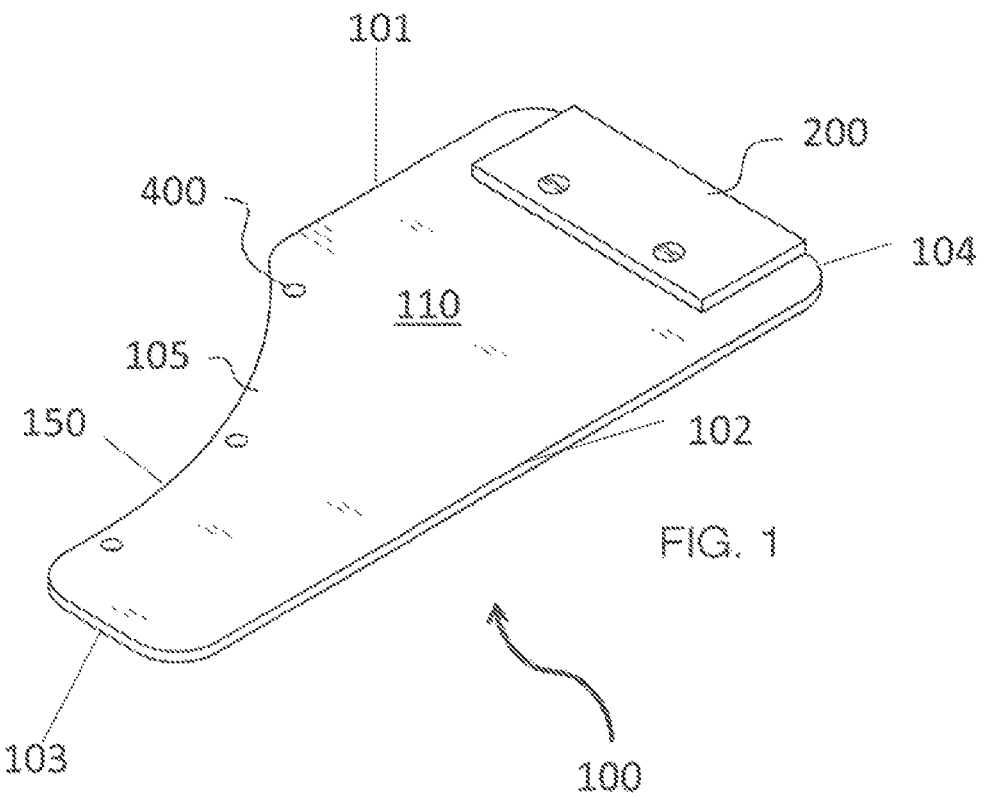
FIG. 1 is a perspective view of a magnetic tire guard of the present invention.
Figure 2:
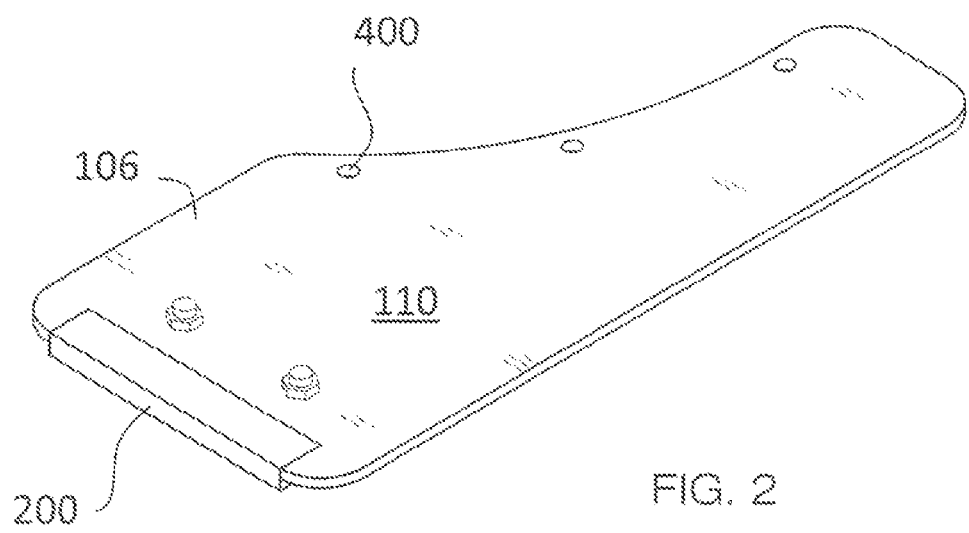
FIG. 2 is a perspective view of a magnetic tire guard of the present invention.
Figure 3:
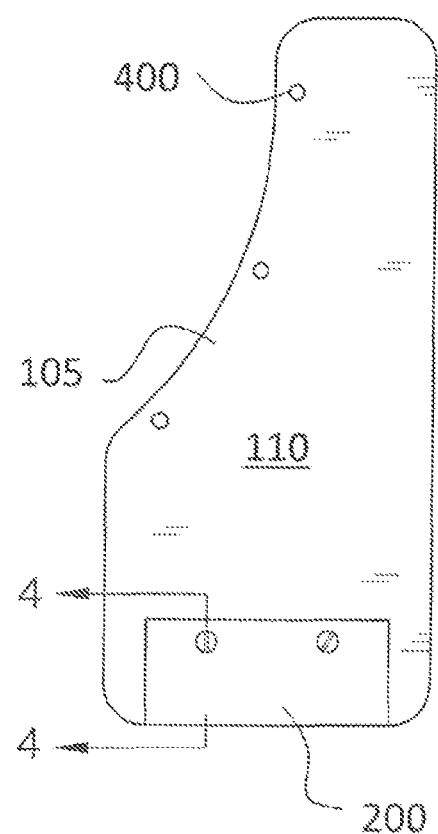
FIG. 3 is a top view of a magnetic tire guard of the present invention.

The following is a listing of numbers corresponding to a particular element refer to herein:

| | |
|---|---|
| 100 | magnetic tire guard |
| 101 | first side edge of flap |
| 102 | second side edge of flap |
| 103 | top edge of flap |
| 104 | bottom edge of flap |
| 105 | front surface of flap |
| 106 | back surface of flap |
| 110 | flap |
| 150 | curved indentation |
| 200 | magnet |
| 300 | bolt |
| 310 | nut |
| 400 | mounting hole |
| 450 | tire |
| 500 | nail |

Referring now to FIGS. 1-5, the present invention features a magnetic tire guard 100 for picking up metal objects and debris such as nails 500, screws, metal fragments, or other such objects before they come in contact with a tire of a vehicle 450. The magnetic tire guard 100 of the present invention is for attaching to the front of a wheel well of a vehicle in front of the tire in a direction facing forward towards the headlights of the vehicle (see FIG. 5). Wheel wells of vehicles are well known to one of ordinary skill in the art. The magnetic tire guard can also be attached to the back of a wheel well of a vehicle in back of the tire.

The magnetic tire guard 100 of the present invention comprises a flap 110 having a front surface 105, a back surface 106, a top edge 103, a bottom edge 104, a first side edge 101, and a second side edge 102. A curved indentation 150 is disposed at the intersection of the first side edge 111 near and the top edge 103. The curved indentation 150 creates a shape that allows for the installation of the magnetic tire guard 100 in a wheel well.

Disposed in the flap 110 along the curved indentation 150 is one or more mounting holes 400. The mounting holes 400 are for receiving a bolt 300, a screw, or other attachment means so that the magnetic tire guard 100 can be attached to the wheel well of the car.

Figure 4:
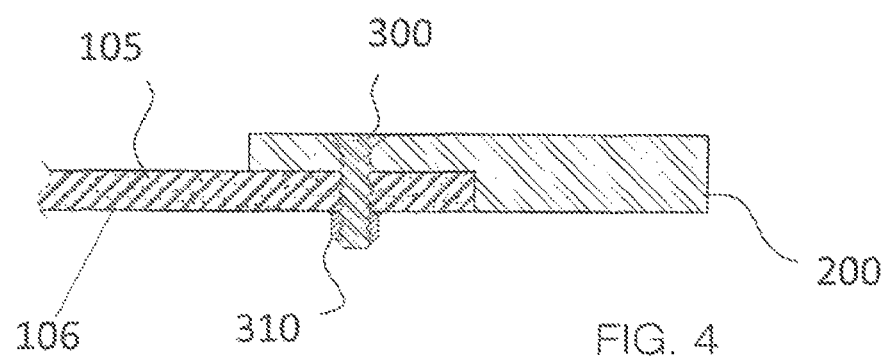
FIG. 4 is a side view and cross sectional view of a magnetic tire guard of the present invention.
Figure 5:
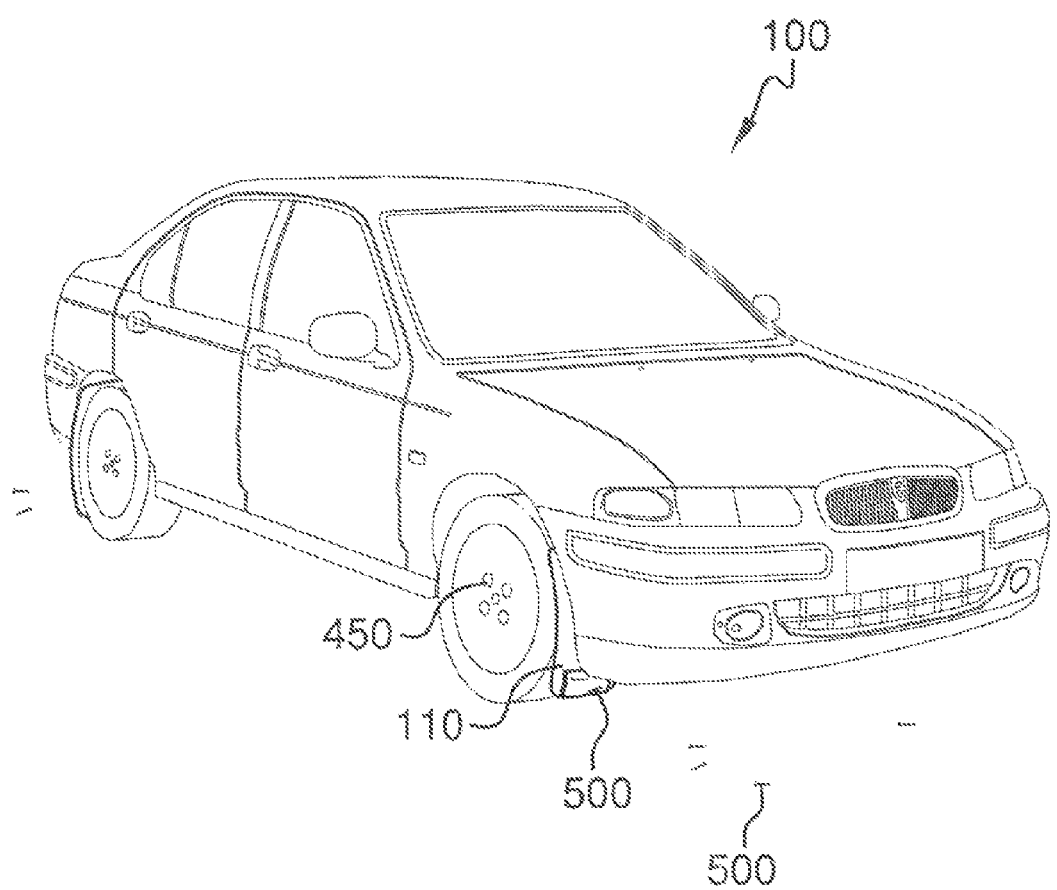
FIG. 5 is a perspective view of a magnetic tire guard of the present invention as used on a vehicle.

Disposed at the bottom edge 104 of the flap is a magnet 200 for attracting metal objects and debris such as nails 500, screws, tacks, metal fragments, the like, or a combination thereof. Without wishing to limit the present invention to any theory or mechanism, it is believed that the magnetic tire guard 100 of the present invention is advantageous because it prevents the metal objects from coming in contact with the tire behind it, thereby preventing the puncturing of the tire. The magnet 200 is attached to the flap 110 via a magnet attachment means (e.g., a nut 310 and bolt 300 as shown in FIG. 4).

In some embodiments, four magnetic tire guards 100 are installed in a vehicle. In some embodiments, the magnetic tire guards 100 are installed in after-market vehicles. In some embodiments, the magnetic tire guards 100 are installed in vehicles during production.

The following the disclosures of the following U.S. Patents are incorporated in their entirety by reference herein: U.S. Pat. No. 6,113,169; U.S. Pat. No. 6,394,475; U.S. Pat. No. 3,737,176; U.S. Pat. No. 2,654,480; U.S. Pat. No. 3,831,847; U.S. Pat. Application No. 2007/0278781.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A magnetic tire guard system, said system comprising:
   (i) a vehicle having a wheel well with a front side wheel well and a back side wheel well, whereas the front side wheel well is closer to the front end of the car and the back side wheel well is closer to the back end of the car
   (ii) a magnetic tire guard device, the device comprising:
      (a) a flap 110 having a front surface 105, a back surface 106, a top edge 103, a bottom edge 104, a first side edge 101, and a second side edge 102;
      (b) a curved indentation 150 disposed at an intersection of the first side edge 111 and the top edge 103 of the flap 110;
      (c) a plurality of mounting holes 400 disposed in the flap 110 along the curved indentation 150, the mounting holes 400 are for receiving a mounting attachment means so as to allow the magnetic tire guard 100 to be attached in a forward-facing direction to a wheel well of a vehicle; and
      (d) a magnet 200 disposed at the bottom edge 104 of the flap 110, the magnet 200 functions to attract metal objects, the magnet 200 is attached to the flap 110 via a magnet attachment means,
   wherein the magnetic tire guard device is attached to the front side wheel well in front of the front tire and in a direction facing forward towards the headlights of the vehicle.

2. The magnetic tire guard device 100 of claim 1, wherein the mounting attachment means includes a bolt or a screw.

3. The magnetic tire guard device_100 of claim 1, wherein the magnet attachment means is a nut 310 and bolt 300.

* * * * *